United States Patent
Bandemer et al.

(10) Patent No.: US 6,735,352 B2
(45) Date of Patent: May 11, 2004

(54) ARRANGEMENT AND METHOD FOR PRODUCING A PREDETERMINABLE POLARIZATION MODE DISPERSION

(75) Inventors: Adalbert Bandemer, Dachau (DE); Dieter Palme, München (DE)

(73) Assignee: Thorlabs, Inc., Newton, NJ (US)

( * ) Notice: Subject to any disclaimer, the term of this patent is extended or adjusted under 35 U.S.C. 154(b) by 0 days.

(21) Appl. No.: 10/228,675

(22) Filed: Aug. 26, 2002

(65) Prior Publication Data

US 2003/0039032 A1 Feb. 27, 2003

(51) Int. Cl.[7] .............................. G02B 6/00; H04B 10/00
(52) U.S. Cl. ........................ 385/11; 398/158; 398/161
(58) Field of Search .......................... 385/11; 398/102, 398/152, 158, 161

(56) References Cited

U.S. PATENT DOCUMENTS

| | | | | |
|---|---|---|---|---|
| 5,473,457 A | * | 12/1995 | Ono | 398/158 |
| 6,130,766 A | * | 10/2000 | Cao | 398/158 |
| 6,144,450 A | * | 11/2000 | Jopson et al. | 356/64 |
| 6,330,375 B1 | * | 12/2001 | Fishman et al. | 385/11 |
| 6,342,945 B1 | * | 1/2002 | Allen et al. | 356/73.1 |
| 6,483,958 B2 | * | 11/2002 | Bandermer et al. | 385/11 |

FOREIGN PATENT DOCUMENTS

| | | | |
|---|---|---|---|
| DE | 19816178 | 10/1999 | H04B/10/18 |
| EP | 1109338 | 6/2001 | H04B/10/18 |

OTHER PUBLICATIONS

Teruhiko Kudou et al: "Theoretical Basis of Polarization Mode Dispersion Equalization Up to the Second Order", Journal of Lightwave Technology, vol. 18, No. 4, Apr. 2000, IEEE, New York.

* cited by examiner

Primary Examiner—David N. Spector
(74) Attorney, Agent, or Firm—Finnegan, Henderson, Farabow, Garrett and Dunner, LLP

(57) ABSTRACT

An arrangement and method for producing a predeterminable polarization mode dispersion by means of double refracting elements provides for the production of a second-order polarization mode dispersion. An element is envisaged which twists the polarization principal axes by an appropriate angle at the output of an arrangement for producing first-order PMD, and the light signal exiting this element is fed into an arrangement which is also an arrangement for producing first-order PMD to produce an output signal having both first- and second-order PMD.

18 Claims, 1 Drawing Sheet

ARRANGEMENT AND METHOD FOR PRODUCING A PREDETERMINABLE POLARIZATION MODE DISPERSION

BACKGROUND OF THE INVENTION

The present invention relates to testing of optical transmission systems, and more particularly to an arrangement and method for producing a predeterminable polarization mode dispersion (PMD).

Such arrangements are required, for example, for producing a certain PMD for measurement or test systems, or for compensating PMD-related distortions in optical transmission systems, and particularly transmission fibers. Since each optical transmission line contains double refracting elements, light signals of different polarizations travel through the line at different group velocities. At a receiver, the light components of different polarizations therefore arrive time-delayed relative to each other. This transit time differential leads to a broadening of the received signal and hence to an impairment of the transmission quality. This can particularly lead to an increase in bit error rate.

Polarization mode dispersion includes all polarization-dependent transit time effects for which the signal propagation may be described fully by the propagation behavior of two polarization modes that are independent of and orthogonal to one another. Since the double refraction may change constantly as a result of external influences such as temperature changes and mechanical load, and also depends on the wavelength, both the position of the principal states of polarization (PSP) and the transit time difference between the PSPs change in the same way. These effects are also referred to as second-order polarization mode dispersion. From the mentioned effects there results a wavelength-dependent PMD behavior fluctuating over time with time constants in a wide time range.

A known arrangement exhibits, in principle, a first polarization splitter/combiner element that splits the incoming signal into two signals having polarization directions which are perpendicular to one another, a delay unit that is arranged in one of the signal lines of both (split) signals, and a second polarization splitter/combiner element that combines the two split signals once again. This known arrangement has the disadvantage that it only allows for the compensation of first-order PMD-related distortions. However, especially in the case of long transmission distances, second-order PMD-related distortions play a significant role.

Another known arrangement for PMD emulation is, for example, an arrangement of a number of double refracting elements, particularly of PM fibers with different or the same group transit times, each of which has a polarization transformation unit installed upstream. This is where the necessary split into the two orthogonal polarization levels occurs as a result of the characteristic of the PM fiber having different propagation velocities for its PSP.

What is desired is an arrangement for producing a predeterminable polarization mode dispersion that also allows the production of a second-order polarization mode dispersion, and which reproduces the polarization mode dispersion of a real transmission fiber as exactly as possible.

BRIEF SUMMARY OF THE INVENTION

Accordingly the present invention provides an arrangement for producing a predeterminable polarization mode dispersion having a first double refracting element or polarization splitter/combiner element rotatable around the direction of propagation of the light that splits the input signal into two signals with polarization directions perpendicular to each other. The first double refracting element passes on the orthogonal polarizations with transit times that are different relative to each other. A second double refracting element or polarization splitter/combiner element also is rotatable around the direction of propagation of the light on which the orthogonally polarized input signals exit as a combined output. There is a rotating element that twists the polarization principal axes behind the second double refracting element by an appropriate angle relative to each other. The light signal exiting the rotating element is fed into an arrangement similar to that before the rotating element. The angle by which the rotating element twists the polarization principal axes relative to each other is adjustable. This makes it possible to adjust the steepness of the principal state of polarization (PSP) and the ratio of the first and second-order polarization mode dispersions (PMD) that make up the predeteminable polarization mode dispersion.

DETAILED DESCRIPTION OF THE INVENTION

Figure 1:
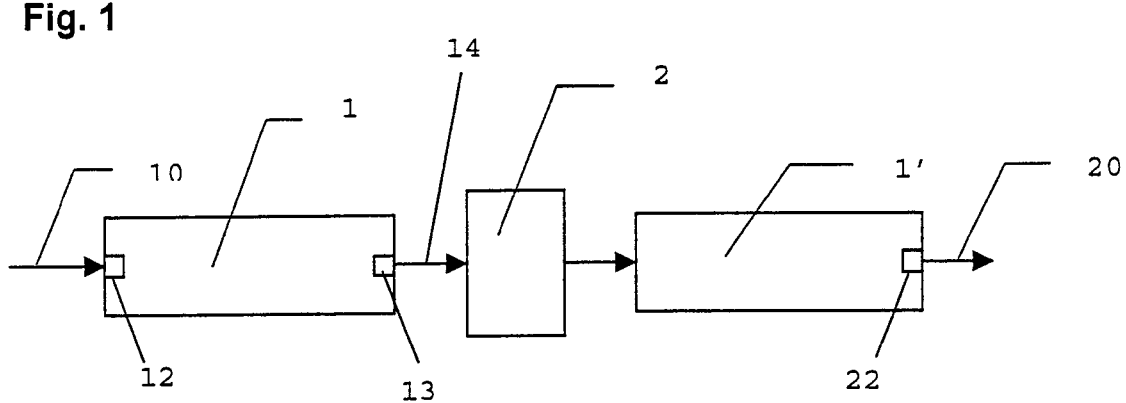
FIG. 1 shows a principle configuration of an arrangement for producing a predeterminable polarization mode dispersion with double refracting elements according to one embodiment of the present invention.

Referring now to FIG. 1 an arrangement according to a first embodiment of the present invention is shown having a first double refracting element 1, whose connection or light coupling device 12 receives the incoming light signal or light pulse 10, or via which the light signal 10 is coupled in. The first double refracting element 1 may particularly be a high-order wave plate or a rod made of calcite or yttrium vanadate, for example, cut as a delay element. The first double refracting element 1 guides the orthogonal polarizations of the incoming signal 10 in accordance with the orientation of the first double refracting element 1 in a split manner at different velocities. At the output or the light decoupling device 13 of the first double refracting element 1 there is arranged a polarization transformer/rotator 2 which transforms or rotates the polarization level of the light signal 14 by an appropriate value or angle. A second double refracting element 1' guides the two transformed orthogonal signals again with proportional amplitudes in the principal states of polarization (PSPs) of the second double refracting element 1'. At the output 22 of the second double refracting element 1' there appears a signal with a first-order PMD that can be set over the length of the first and the second double refracting elements 1, 1', and hence the transit time difference for the orthogonal signal components and the rotation of the polarization transformer/rotator 2.

Figure 2:
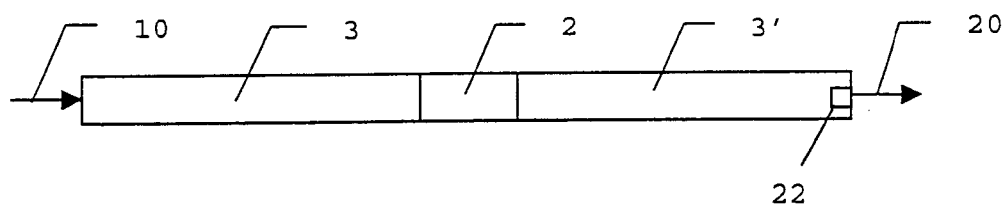
FIG. 2 shows a principle configuration of an arrangement for producing a predeterminable polarization mode dispersion with fiber optical components according to another embodiment of the present invention.

FIG. 2 shows the same configuration using double refracting fibers (PM fibers) 3, 3' as double refracting elements, the polarization transformation/rotation in this case being accomplished by twisting the second fiber 3' relative to the first fiber 3. This twisting is preferably possible by fixed splicing under a predetermined angle or by the use of a rotating device 2 that may also be designed as a polarization transformer/rotator. An influence on the transit time difference is achievable via an additional stress device, which is effected by means of mechanical deformation of the fibers through radial pressure or through temperature gradients.

The signal 10 is fed into the first PM fiber 3 and, via the polarization transformer/rotator device 2, enters the second PM fiber 3' which is thereby twisted in the PSPs relative to the first PM fiber 3'. At the output 22 of the PM fiber 3' an output signal 20 having a first-order PMD results.

Figure 3:
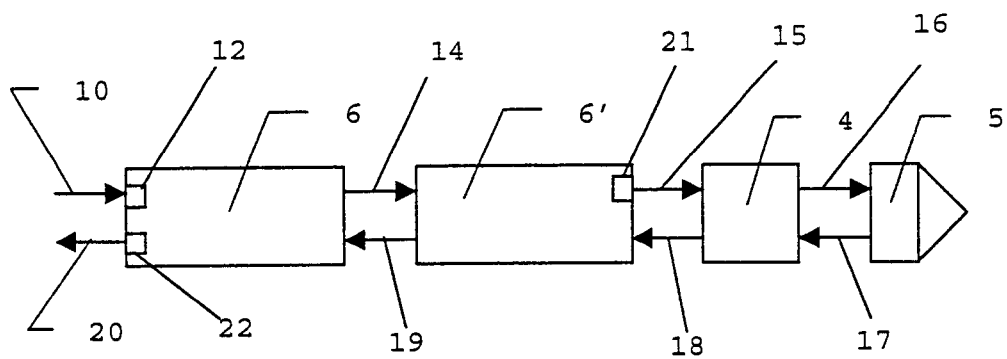
FIG. 3 shows a principle configuration of an arrangement for producing a first and second-order predeterminable polarization mode dispersion making double use of the elements according to yet another embodiment of the present invention.

To produce a second-order polarization mode dispersion, a polarization rotator 4 is provided, as shown in FIG. 3, which twists the polarization principal axes of the signal 15 exiting the end of the second double refracting element 6' by a preferably adjustable angle or rotation angle relative to each other. The signal 16 thus gained is converted or deflected or reflected by a deflection device 5 into a reversed and parallel shifted beam 17 and henceforth coupled, in reverse direction, into or guided through the second double refracting element 6' and then the first double refracting element 6 twisted relative thereto. The manipulated signal 20 is available at the spatially separate output 22 or exits therefrom or is decoupled therefrom. As a result of the double passage through the PMD-producing elements 6, 6', a second-order PMD is also created in addition to the first-order PMD. Alternatively, the beam 16 may be deflected into separate, additionally provided PMD-producing elements as shown in FIGS. 1 and 2.

Above, the invention has been described on the basis of an embodiment as an example. Of course, the most diverse modifications are possible. Thus it is possible that the angle by which the elements twist the polarization principal axes relative to each other is adjustable. For the adjustment of the angle, optical slip rings and/or inclined wave plates as well as polarization rotators may be used.

As results from the embodiment described above, for the generation of a polarization mode dispersion which corresponds to the second-order PMD of a real fiber, an arrangement having two double refracting elements is assumed which is developed such that additional elements are provided which twist the polarization orientation of the relevant incoming beam relative to the transit time-generating elements by a suitable angle relative to each other. The light signal or light pulse exiting these elements is fed into a further arrangement also exhibiting a polarization splitter/combiner element, a delay line and a further polarization splitter/combiner element for combining the two signal lines or the double refracting element. With this arrangement it is possible to also produce a second-order polarization mode dispersion in addition to a first-order polarization mode dispersion. Of particular advantage is the fact that it is preferably not even necessary to employ additional components that would increase costs. It is rather preferably possible to achieve the production of a second-order polarization mode dispersion by having the arrangement, which has the polarization orientation twisted in a defined way, passed through one more time, preferably on a separate optical path as shown in FIG. 3. At the input to the device, the signal, which appears spatially displaced, is then decoupled. The decoupled signal then exhibits the desired first-order and second-order polarization mode dispersion. Moreover, it is advantageous that the double refracting elements exhibit a dispersion of the refractive indices for the ordinary and extraordinary beam. This leads to another desired dependency of the transit time difference on the wavelength.

A special advantage of this arrangement is that for the adjustment of the second-order PMD, only a single adjustment value, namely the transit time difference, has to be predetermined.

For the feed twisted in the polarization direction a twisting angle, by which the rotating element twists the polarization principal axes relative to each other, of approximately 35 degrees to 55 degrees, preferably approximately 45 degrees, has proved particularly appropriate. At such an angle, the statistic ratio between the first-order polarization mode dispersion (PMD) and the second-order polarization mode dispersion (PMD) is practically sufficiently adapted to that of a real transmission fiber in optical networks.

Also preferred is a deflection device that causes the output signal, which is twisted in its polarization, to pass through the second double refracting element and the first double refracting element backwards on a separate optical path, the signal being decoupled or exiting at the first double refracting element. This makes it possible for one or the same optical elements to be passed through twice, so that no further optical elements need to be provided and hence costs can be saved.

The first double refracting element preferably exhibits a delay line which delays one of the orthogonal polarizations relative to the other of the orthogonal polarizations, the delay line being preferably realized optically or electrically.

A first optical realization employs at least two double refracting elements that are twistable relative to each other, with the characteristic of having different propagation velocities for orthogonal polarizations. For a second realization of the delay line, the fibers as the double refracting elements are subjected to mechanical forces so that the optical parameters of the fibers change.

The adjustment of the angle, too, by which the principal axes are twisted relative to each other or against each other may occur in several ways. Thus it is possible that, for the adjustment of the angle, two PM fibers are spliced under an angle corresponding to the angle to be adjusted. Moreover, optical slip rings and/or wave plates, and also optically active components, may be used in the manner of polarization rotators for the adjustment of the angle.

In the embodiments that use double refracting elements, separate polarization splitter/combiner elements may be totally dispensed with because both the splitting into orthogonal components and the transit time differences are reached intrinsically.

A method for producing a predeterminable polarization mode dispersion is also made available by splitting of a light input signal into two signals that have polarization directions which are perpendicular to one another by means of a first double refracting element or a polarization splitter/combiner element, the first double refracting element passing on the orthogonal polarizations with transit times that are different relative to each other. Then the signals with orthogonal polarizations exiting the first double refracting element are combined by means of a second double refracting element or a polarization splitter/combiner element also rotatable around the direction of propagation of the light, on which the orthogonally polarized input signals exit as an output. The polarization principal axes are twisted relative to each other behind the second double refracting element by an appropriate angle by means of a rotating element for producing a second-order polarization mode dispersion. The signal that exits the twisting element is re-split into two signalsthat have polarization directions which are perpendicular to one another by means of a double refracting element or a polarization splitter/combiner element, the double refracting element passing on the orthogonal polarizations with transit times that are different relative to each other. Finally the signals with orthogonal polarizations that exit the double refracting element are re-combined by means of a double refracting element or a polarization splitter/combiner element also rotatable around the direction of propagation of the light on which the orthogonally polarized input signals exit as an output.

Thus the present invention provides an arrangement and method for providing a predeterminable polarization mode dispersion by generating from an input light signal a first output signal having first-order PMD with a first set of double refracting elements, rotating the polarization axes of the first output signal relative to each other to produce an interim signal, and passing the interim signal through a second set of double refracting elements to produce a final output signal having first- and second-order PMD as the predeterminable PMD.

What is claimed is:

1. An arrangement for producing a predeterminable polarization mode dispersion (PMD) comprising:
   a first-order PMD generator having a first double refracting element for splitting an input light signal into two light signals with polarization directions orthogonal to each other, the two light signals having different transit times through the first double refracting element, and a second double refracting element to which the two light signals are input to produce a combined light signal including first-order PMD as an output,
   a rotating element having the combined light signal as an input for twisting principle state of polarization axes of the combined light signal by an appropriate angle relative to each other to produce a twisted combined light signal, and
   a second-order PMD generator also having a first double refracting element for splitting the twisted combined light signal into two light signals with polarization directions orthogonal to each other, the two light signals having different transit times through the first double refracting element, and a second double refracting element to which the two light signals are input to produce an output combined light signal including first- and second-order PMD as an output.

2. The arrangement according to claim 1 wherein the appropriate angle by which the rotating element twists the principle state of polarization axes relative to each other is adjustable.

3. The arrangement according to claim 1 wherein the angle by which the rotating element twists the principal state of polarization axes relative to each other is approximately 35 degrees to 55 degrees.

4. The arrangement according to claim 1 wherein the angle by which the rotating element twists the principal state of polarization axes relative to each other is approximately 45 degrees.

5. The arrangement according to claim 1 further comprising a deflection device for reflecting the twisted combined light signal back through the first-order PMD generator on a reverse optical path as the second-order PMD generator such that the output combined light signal is output adjacent to and decoupled from the input light signal input to the first double refracting element.

6. The arrangement according to claim 1 wherein the first double refracting element comprises a delay line for delaying one of the two light signals relative to the other.

7. The arrangement according to claim 6 wherein the input light signal in the delay line is guided as a free beam and the difference between the transit times is changed by a change in geometric arrangement of individual components.

8. The arrangement according to claim 6 wherein the double refracting elements are twisted relative to each other as the delay line for adjusting the delay.

9. The arrangement according to claim 6 wherein the delay line comprises a fiber for adjusting the delay in response to mechanical forces.

10. The arrangement according to claim 6 wherein the delay line comprises two PM fibers spliced together at a predetermined angle according to the delay desired.

11. The arrangement according to claim 10 wherein the PM fibers are coupled by a rotator selected from the group consisting of optical slip rings, optically active elements and inclined wave plates for adjusting the predetermined angle.

12. A method of producing a predeterminable polarization mode dispersion (PMD) comprising the steps of:
    generating a first-order PMD signal by splitting an input light signal into two light signals having polarization directions that are orthogonal to one another and have different transit times and by combining the two light signals to produce a combined light signal;
    twisting of principal state of polarization axes of the combined light signal relative to each by an appropriate angle to produce a twisted combined light signal; and
    generating a second-order PMD signal from the twisted combined light signal by splitting of the twisted combined light signal into two light signals having polarization directions that are orthogonal to one another and have different transit times and by combining of the two light signals to produce an output combined light signal including first- and second-order PMD.

13. An apparatus for producing a predeterminable polarization mode dispersion comprising:
    first means for generating from an input light signal a first output light signal having first-order polarization mode dispersion;
    means for rotating the polarization axes of the first output light signal relative to each other by an adjustable angle to create an interim light signal; and
    second means for generating from the interim light signal a second output light signal having first- and second-order polarization mode dispersion.

14. The apparatus as recited in claim 13 wherein the first means comprises:
    a first double refracting element having the input light signal as an input and providing a pair of orthogonally polarized light signals as an output, each of the pair of orthogonally polarized light signals having a different transit time through the first double refracting element; and
    a second double refracting element having the pair of orthogonally polarized light signals as an input and being oriented relative to the first double refracting element to provide the first output signal as an output.

15. The apparatus as recited in claim 14 wherein the first means further comprises means for transforming the pair of orthogonally polarized light signals by an appropriate angle prior to input to the second double refracting element.

16. The apparatus as recited in claim 13 wherein the first means comprises:
    a first double refracting fiber having the input light signal as an input and providing a pair of orthogonally polarized light signals as an output, each of the pair of orthogonally polarized light signals having a different transit time through the first double refracting fiber; and
    a second double refracting fiber having the pair of orthogonally polarized light signals as an input and being oriented relative to the first double refracting fiber to produce the output signal as an output.

17. The apparatus as recited in claim 16 wherein the first means further comprises means for transforming the pair of orthogonally polarized light signals by an appropriate angle prior to input to the second double refracting fiber.

18. The apparatus as recited in claim 13 further comprising means for reflecting the interim light signal back through the first means as the second means along a reverse optical path parallel to a forward optical path through the first means to provide the second output light signal at an output adjacent but spatially separate from the input.

* * * * *